United States Patent [19]

van Ackeren et al.

[11] Patent Number: 4,922,505

[45] Date of Patent: May 1, 1990

[54] PLANT FOR UTILIZATION OF EXHAUST GASES OF AN ELECTRIC STEEL FURNACE

[75] Inventors: Paul van Ackeren, Duisburg; Karl-Heinz Schmitz, Tönisvorst; Bernfried Stache, Krefeld; Günter Kleff, Straelen; Heinrich Becker, Moers, all of Fed. Rep. of Germany

[73] Assignee: Mannesmann Aktiengesellschaft, Düsseldorf, Fed. Rep. of Germany

[21] Appl. No.: 219,669

[22] Filed: Jul. 15, 1988

[30] Foreign Application Priority Data

Jul. 16, 1987 [DE] Fed. Rep. of Germany ....... 3723783

[51] Int. Cl.$^5$ ............................................. F27D 17/00
[52] U.S. Cl. .................................... 373/9; 373/80
[58] Field of Search ................. 373/9, 8, 80; 266/144, 266/156, 158, 159

[56] References Cited

U.S. PATENT DOCUMENTS

| | | | |
|---|---|---|---|
| 4,437,186 | 3/1984 | Inai | 373/9 |
| 4,506,370 | 3/1985 | Yoshimatsu | 373/9 |
| 4,611,339 | 9/1986 | Saitoh | 373/9 |

FOREIGN PATENT DOCUMENTS 3524171 7/1985 Fed. Rep. of Germany ..

OTHER PUBLICATIONS

"Iron & Steel Engineer", Nov. 1983, pp. 54-61, article Scrap Heating by Exhaust Gas from Electric Arc Furnaces.

Primary Examiner—Roy N. Envall, Jr.
Attorney, Agent, or Firm—Horst M. Kasper

[57] ABSTRACT

A plant for the processing of exhaust gases of an electric melting furnace for steel is disclosed, which allows to improve the cleaning of heavy-metal-containing exhaust gases from electric arc furnaces for steel production from scrap, which allows to decrease the energy use for capturing waste from the exhaust gases, which avoids the odor molestation by the waste gases generated in connection with an electric melt furnace operation during the preheating and for making useful the exhaust gases for the smelting under incorporation of the drying of oil-containing roll sinter muds, where simultaneously the oil-content of these roll sinter muds is used for saving of electric arc melting energy.

25 Claims, 1 Drawing Sheet

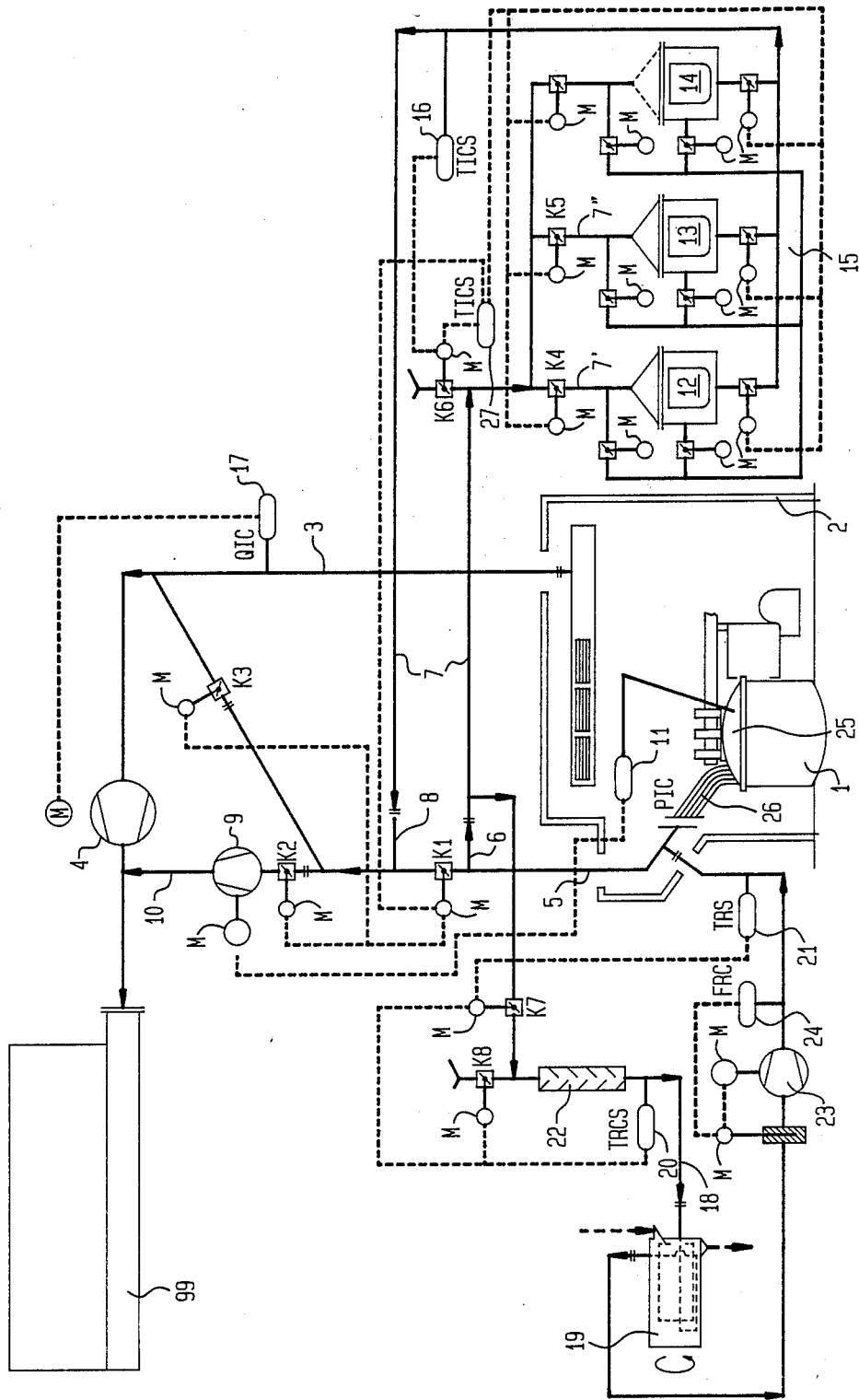

PLANT FOR UTILIZATION OF EXHAUST GASES OF AN ELECTRIC STEEL FURNACE

BACKGROUND OF THE INVENTION

1. Field of the Invention

The invention relates to a plant for the use of exhaust gases of an electric melting furnace for steel.

2. Brief Description of the Background of the Invention Including Prior Art

Plants for the use of the heat content or, respectively, for cleaning of exhaust gases of electric melting furnaces are known, for example, from the German Patent DE-PS 3,214,300, the German Patent Application Laid Open DE-OS 1,804,098, as well as the German Patent Application Laid Open DE-OS 3,121,860. In these references, the hot furnace gases are fed to a station for preheating of the charging scrap. It is further known to operate such plants in connection with a plant for the separation and collection of dust from the exhaust gas.

It is further known to dedust by secondary cleaning the air of a shop which contains such a melting furnace. It is also known from the state of the art to provide a casing around electric melting furnaces for steel production from scrap. Both a substantial decrease of the noise molestation at the working place and in the environment and surrounding of the plant as well as a more effective capturing of the dust and gas emission from the furnace is thereby achieved. In order to capture the dust emission, an amount of gas is sucked over a so-called fourth roof hole from the oven via a water-cooled pipe band with adjustable coupling box for adjustment of the combustion air volume required for post-burning of the carbon monoxide-containing oven exhaust gases for capturing of dust emission. In general, the post-burnt exhaust gas volume from the fourth roof hole amounts to about 1000 $m^3$ n/h and ton of oven capacity. In order to control the exhaust gas cleaning to a value prescribed by environmental regulations, for example by TA-Luft 86 in the Federal Republic of Germany, of 20 $mg/m^3$ n in a filtering collector, this exhaust gas is cooled to 140° C. The tubular coolers corrode very quickly due to the aggressiveness of the exhaust gases. Acrid smelling and harmful smokes are generated in the context of the usual scrap preheating by carbonizing at low temperature of organic components in the scrap, such as oil, lacquer, and plastics, which smokes cannot be collected in the filter. For this reason, a cooling of the exhaust gas by a cooler or a scrap preheating is frequently dispensed with and the required low exhaust gas temperature is achieved by an increase in the cold air admixture, i.e. substantially more air is sucked off from the casing than would be required for capturing the secondary dust emission. This method of operation, however, is unsatisfactory, because the filter is continuously subjected to an unnecessarily high exhaust gas volume, because the waste heat is not used for preheating the scrap and thus for energy saving of the current required for melting, and because, in addition, the transport of additional cold air requires a higher energy use of the exhaust blowers.

The disposal of oil or, respectively, water-containing roll sinter mud is a problem which was conventionally solved by adding such roll scale to agglomeration plants for the generation of a blast furnace sinter. The electric filter cleaning plants present in such agglomeration plants have however been frequently destroyed by filter fires based on the oil-containing vapors. This disposal method is therefore no longer available. A chemical preparation and treatment of these roll sinter muds cannot be justified on economic grounds.

However, the cleaned roll sinter muds form an excellent starting material for electric melting furnaces.

SUMMARY OF THE INVENTION

1. Purposes of the Invention

It is an object of the invention to provide a steel furnace plant, which allows to minimize two exhaust gas streams, i.e. both from the fourth roof hole with the scrap preheating as well as from the exhaust of the oven casing with dust collection relative to the amounts to be exhausted.

It is yet another object of the present invention to reduce the electric input energy for an electric melting furnace.

It is another object of the invention to improve the filtering separators and collectors relative to the collection of heavy-metal-containing dust.

The disposal of oil and water-containing roll sinter mud has been another problem up to now where the invention can provide substantial improvement.

It is yet a further purpose of the invention to create a possibility for the waste disposal of roll sinter muds in joint operation with an electric melt furnace plant.

A further object of the invention is to improve the cleaning of heavy-metal-containing exhaust gases from electric arc furnaces for steel production from scrap, to decrease the use of energy for capturing of the waste emission, to avoid the odor molestation by the exhaust gases which are generated in connection with an electric melting furnace operation in the scrap preheating, and to employ and use oil-containing roll sinter muds for the smelting operation by way of drying, where simultaneously the oil content of the roll sinter muds are used for saving of electric melting energy input.

2. Brief Description of the Invention

The present invention provides for a plant for the use of waste gases of an electric melting furnace for steel. The electric melting furnace is surround by a protective housing. The protective housing is connected with an exhaust gas line to a blower station. A bag filter plant is provided for cleaning of the furnace gas. The blower station and the bag filter plant form an exhaust device for the furnace gas. Said exhaust device is connected to the electric melting furnace. An adjustable first valve is disposed between the connection location and the return location of the exhaust device. A first bypass is disposed to run in series to the exhaust device and has a return location. A preheating or drying station, for starting materials to be charged to the electric melting furnace, is disposed in the first bypass of the exhaust device. A branch is disposed between the return location of the first bypass and the exhaust line. A first auxiliary blower, which can be switched on or, respectively, switched off, is disposed within the exhaust device in the branch between the return location of the first bypass and the exhaust line via second and third valves.

A second bypass can be connected in series to the first bypass. A drying station can be connected to the second bypass or, respectively, to the exhaust device ahead of the connection location or after the return location via a drying line, thus forming the second bypass. Said drying line can be switched on or off via a seventh valve. A second auxiliary blower can be placed into the drying line of the drying station for feeding back of the exhaust air into the exhaust device ahead of a withdrawal location.

A quantity measuring apparatus can be associated with the drying line and follow the second auxiliary blower. The throughput amount of the second auxiliary blower can be controlled by the following quantity measuring apparatus depending on a preset set point value.

A pressure measuring apparatus can be connected to the first auxiliary blower, where the electric melting furnace can comprise a furnace chamber, and where the pressure measuring apparatus can measure the gas pressure in the furnace chamber, and where the gas pressure in the furnace chamber can be controlled according to the pressure condition in the furnace chamber.

The first bypass can be branched into a first line and a second line. A preheating station disposed in the first bypass can include a first chamber of a scrap preheating station connected to the first line and a second chamber of a scrap preheating station connected to the second line. A fourth valve can be disposed in the first line, where the first line can be switched on or, respectively, switched off with the fourth valve. A fifth valve can be disposed in the second line, where the second line can be switched on or, respectively, switched off with the fifth valve. The exhaust gas leaving the scrap heating station can be cooled to a temperature where condensation of the organic components contained in the exhaust gas can be assured. A temperature measuring apparatus can be disposed in the first bypass following the preheating station. A control device for infiltrated, false air admixture can be provided in the first bypass for assuring cooling. A sixth valve can connect the control device with the temperature measuring apparatus in the first bypass.

A main exhaust line can be connected to the electric melting furnace. A dust measuring apparatus measures the dust content in the main exhaust line. A third blower station can be disposed in the main exhaust line. The third blower station can be connected to the dust measuring apparatus for minimizing the blower capacities depending on a preset dust content.

An eighth valve for the infiltrated, false air admixture can be disposed in the second bypass between the seventh valve and the drying station.

A static mixer can be connected to the eighth valve and be disposed in the second bypass.

A feed temperature measuring device can follow the static mixer such that the eighth valve can be controlled depending on temperature by the feed temperature measuring device. A control circuit can be connected to the feed temperature measuring device. A return-temperature measuring device superordinated to the control circuit can be associated with the feed temperature measuring device. Said return temperature measuring device can measure the temperature of the exhaust gas of the drying station and can control the gas volume fed via the second bypass depending on temperature by adjusting of the seventh valve.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which is shown one of the various possible embodiments of the present invention:

FIG. 1 shows a schematic diagram of an electric melting furnace plant for steel production.

DESCRIPTION OF INVENTION AND PREFERRED EMBODIMENT.

The present invention includes a method for setting up means for handling waste gases of an electric melting furnace for steel. An electric melting furnace is surrounded with a protective housing. The protective housing is connected with an exhaust gas line to a blower station. The furnace gas is dedusted and cleaned with a bag filter plant. The blower station and the bag filter plant form an exhaust device for the furnace gas. The exhaust device is connected to the electric melting furnace. The adjustable first valve is disposed between the connection location and the return location of the exhaust device. A first bypass is placed in series to the exhaust device and has a return location. A preheating or drying station for starting materials to be charged to the electric melting furnace is placed in the first bypass of the exhaust device. A branch is placed between the return location of the first bypass and the exhaust line. A first auxiliary blower, which can be switched on or, respectively, switched off, is placed within the exhaust device in the branch between the return location of the first bypass and the exhaust line via a second and a third valve.

A second bypass can be connected in series to the first bypass. A drying station can be connected to the second bypass or, respectively, to the exhaust device ahead of the connection location or after the return location via the drying line, thus forming a second bypass. Said drying line can be switched on or off via a seventh valve. A second auxiliary blower can be placed into the drying line of the drying station for feeding back of the exhaust air into the exhaust device ahead of a withdrawal location.

A quantity measurement apparatus can be connected to the drying line and following the second auxiliary blower, where the throughput amount of the auxiliary blower can be controlled by the quantity measuring apparatus depending on a preset set point value. A pressure measuring apparatus can be connected to the first auxiliary blower, where the electric melting furnace can comprise a furnace chamber and where the pressure measuring apparatus can measure the gas pressure in the furnace chamber and where the gas pressure in the furnace chamber can be controlled according to the pressure condition in the furnace chamber. The first bypass can be branched into a first line and a second line. A preheating station can be placed in the first bypass including a first chamber of a scrap preheating station connected to the first line and a second chamber of a scrap preheating station connected to the second line. A fourth valve can be placed in the first line, where the first line can be switched on or, respectively, switched off with the fourth valve. A fifth valve can be placed in the second line where the second line can be switched on or, respectively, switched off with the fifth valve and where the exhaust gas, leaving the scrap heating station, can be cooled to a temperature where condensation of the organic components contained in the exhaust gas can be assured. A temperature measuring apparatus can be placed in the first bypass following the preheating station. A control device for infiltrated, false air admixture is placed in the first bypass for assuring cooling. The control device can be connected to the temperature measuring apparatus in the first bypass with a sixth valve. A main exhaust line is connected to the electric melting furnace. A dust measuring apparatus for measuring the dust content can be placed into the main exhaust line. A third blower station is placed into the main exhaust line. The third blower station is connected to the dust measuring apparatus for minimizing the blower capacities depending on a preset dust content.

An eighth valve for the infiltrated, false air admixture is placed in the second bypass between the seventh valve and the drying station. A static mixer can be connected to the eighth valve in the second bypass. A feed temperature measuring device can be placed to follow the static mixer such that the eighth valve can be controlled depending on temperature by the feed temperature measuring device. A control circuit can be connected to the feed temperature measuring device. A return-temperature measuring device can be superordinated to the control circuit associated with the feed temperature measuring device. Said return temperature measuring device can measure the temperature of the exhaust gas of the drying station and can control the gas volume fed via the second bypass depending on temperature by adjusting of the seventh valve.

The instant invention furthermore provides for a method using waste gases of an electric melting furnace for steel. The furnace gas from the electric melting furnace is dedusted and cleaned in a bag filter plant. A blower station and the bag filter plant form an exhaust device for the furnace gas. Said exhaust device is connected to the electric melting furnace. An adjustable first valve is disposed between the connection location and the return location of the exhaust device. The electric melting furnace is surrounded by a protective housing which is connected with an exhaust gas line to the blower station. A first bypass is disposed to run in series to the exhaust device and has a return location. Starting materials to be charged to the electric melting furnace are preheated and dried in a preheating and drying station disposed in the first bypass of the exhaust device. A branch is disposed between the return location of the first bypass and the exhaust line. A first auxiliary blower, which is switched on and off, is disposed within the exhaust device in the branch between the return location of the first bypass and the exhaust line via a second and a third valve.

A drying line forming a second bypass connected in series to the first bypass can be switched on and off with a seventh valve. The drying station is connected to the second bypass or, respectively, to the exhaust device ahead of the connection location or after the return location. Exhaust air is fed back into the exhaust device ahead of a withdrawal location with a second auxiliary blower placed into the drying line of the drying station.

The throughput amount of the first auxiliary blower can be controlled by a following quantity measuring apparatus associated with the drying line and following the second auxiliary blower, depending on a preset set point value. The gas pressure in the furnace chamber can be measured with a pressure measuring apparatus connected to the first auxiliary blower, where the electric melting furnace can comprise a furnace chamber. The gas pressure in the furnace chamber can be controlled according to the pressure condition in the furnace chamber and a set point. The first bypass can be branched into a first line and a second line. A preheating station disposed in the first bypass can include a first chamber of a scrap preheating station connected to the first line and a second chamber of a scrap preheating station connected to the second line. The exhaust gas leaving a scrap heating station can be cooled to a temperature where condensation of the organic components contained in the exhaust gas can be is assured. A fourth valve can be disposed in the first line and the first line can be switched on or, respectively, switched off with the fourth valve. A fifth valve can be disposed in the second line and the second line can be switched on or, respectively, switched off with the fifth valve. A temperature measuring apparatus can be disposed in the first bypass following the preheating station. A control device for infiltrated, false air admixture can be provided in the first bypass for assuring cooling. A sixth slider can connect the control device with the temperature measuring apparatus in the first bypass. A main exhaust line can be connected to the electric melting furnace. The dust content in the main exhaust line can be measured with a dust measuring apparatus. A third blower station can be disposed in the main exhaust line. The blower capacities can be minimized depending on a preset dust content with a third blower station connected to the dust measuring apparatus.

An eighth valve for the infiltrated, false air admixture can be disposed in the second bypass between the seventh valve and the drying station and can be controlled depending on temperature measured at a feed temperature measuring device. A static mixer can be connected to the eighth valve and be disposed in the second bypass. The feed temperature measuring device can follow the static mixer and a control circuit can be connected to the feed temperature measuring device. The temperature of the exhaust gas of the drying station can be measured with a return-temperature measuring device superordinated to the control circuit associated with the feed temperature measuring device. The gas volume fed via the second bypass can be controlled with return temperature measuring device depending on temperature by adjusting of the seventh valve.

In accordance with the present invention, there is provided a plant for the use of waste gases of an electric melting furnace for steel. The plant comprises an electric melting furnace, which is connected to an exhaust device for the furnace gas with a blower station and a bag filter plant for cleaning and cleaning of the furnace gas. A preheating or drying station for starting materials to be charged to the electric melting furnace is disposed in a bypass of the exhaust device. The exhaust device is provided with at least one adjustable valve between the connection location and the return location. The electric melting furnace 1 is surrounded by a protective housing 2, which protective housing 2 is connected with an exhaust gas line 3 to the blower station 4. An auxiliary blower 9, which can be switched on or, respectively, switched off, is disposed within the exhaust device 5 in a branch 10 between the return location 8 of the bypass 7 and the exhaust line 3 via valve K2, K3.

A drying station 19 can be connected to the bypass 7 or, respectively, to the exhaust device ahead of or after the connection location 6 via a line 18, forming a further bypass. Said line 18 can be switched on or off via a valve K7. A further auxiliary blower 23 can be placed into the line 18 of the drying station 19 for feeding back of the exhaust air into the exhaust device 5 ahead of a withdrawal location.

The throughput amount of the auxiliary blower 23 can be controlled by a following quantity measuring apparatus 24 depending on a preset set point value.

The auxiliary blower 9 can be connected with a pressure measuring apparatus 11, which measures the gas pressure in the furnace space 1 and which can be controlled according to the pressure condition in the furnace chamber.

The bypass 7 can be branched into at least two lines 7', 7", which lines 7', 7" in each case can be connected to a chamber 12, 13 of a scrap preheating station 15. The lines 7', 7" can be switched on or, respectively, switched off in each case with a valve K4, K5. The exhaust gas leaving the scrap heating station can be cooled to a temperature where condensation of the organic components contained in the exhaust gas can be assured and where furthermore a control device for infiltrated, false air admixture can be provided in a bypass 7 for this purpose. Said control device can be connected via a valve K6 with a temperature measuring apparatus 16 in the bypass 7 following the preheating station 15.

The blower station 4 can be connected to a dust measuring apparatus 17, which dust measuring apparatus 17 measures the dust content in the exhaust line 3 and where the blower capacities can be minimized depending a preset dust content.

A further valve K8 for the infiltrated, false air admixture can be provided in the line 18 between the valve K7 and the drying station 19. A static mixer 22 connected to the valve K8 can be disposed in the line 18.

The valve K8 can be controlled depending on temperature by a feed temperature measuring device 20, which follows the static mixer 22. A return-temperature measuring device 21 can be superordinated to the control circuit associated with the feed temperature measuring device 20. Said measuring device can measure the temperature of the exhaust gas of the drying station 19 and can control the gas volume fed via the line 18, depending on temperature by adjusting of the valve K7.

Referring now to the figure, there is illustrated an electric melting furnace 1, which is surrounded by a protective housing 2. The electric melting furnaces include direct and indirect resistance furnaces. The direct resistance furnace can be low frequency induction furnaces and high and medium frequency coreless induction furnaces. The electric melting furnaces include indirect or independent arc furnaces, direct arc furnaces, and combination arc and resistance furnaces. The indirect or independent arc furnaces include further arc furnaces with direct current arc or alternating current arc, where the alternating current art furnaces may be single or multiphase stationary, oscillating, or rolling. The direct arc furnaces include series arc and single-arc furnaces. The combination arc and resistance furnaces can be two phase or three phase furnaces.

The protective housing 2 is connected to a blower station 4 via an exhaust gas line 3. A bag filter plant house 99 follows the blower station 4. The suction line of the blower station is controlled by a dust measuring apparatus 17 for the purpose of minimum use of energy for the drive.

The cover or roof 25 of the furnace 1 is provided with an exhaust gas connection 26. The exhaust device 5 can be connected, as desired, directly to the blower station 4 with the aid of the installed valve K1, K2, K3, or the exhaust device 5 can be connected to the exhaust gas line 3 behind the blower station with the aid of an installed auxiliary blower 9 in a branch 10 of the exhaust device 5. The auxiliary blower 9 can be controlled relative to its power, depending on the pressure in the furnace chamber, which is determined by a pressure measuring apparatus 11.

It is further mentioned that, in case of a mode of operation without scrap preheating, the valves K1 and K3 are to be opened, and valve K2 is to be closed such that the blower station 4 can operate with full power. However, this is a state and mode of operation which is not desirable.

According to the invention, a bypass 7 is provided in the exhaust device 5. The valve K1 is disposed between the connection point 6 of the bypass 7 and the return point 8. When the valve K1 is the "closed" position, the furnace exhaust gas is fed to a scrap preheat station. The scrap preheat station 15 comprises three chambers 12, 13, 14 of which, depending on operating conditions, two are used simultaneously. In the present case, the two chambers are the chambers 12 and 13, which are connected with the branches of the bypass 7', 7" and which can be connected in parallel or in series with the aid of the valve K4 and K5.

In case of incorporation of the scrap heat station 15 into the process, the valve K1 and K3 are closed such that the exhaust gas is guided from the furnace 1 via the exhaust device 5, the bypass 7, and the chambers 12, 13. A temperature measuring apparatus 16 is disposed in the bypass 7 between the scrap heat station 15 and the return station 8. The temperature measuring apparatus 16 is connected with a valve K6 in the bypass 7 ahead of the scrap heat station 15. This valve K6 serves to a possible fresh air feed-in, in order to avoid an overheating of the scrap baskets in the chambers 12, 13 and, on the other hand, in order to maintain the gas temperature with certainty below a temperature of about 80° C. after leaving of the scrap heat station 15. The low exit temperature of the gas leaving the scrap heat station assures that an odor molestation of the environment and surroundings is avoided, since volatile parts condense at the scrap and subsequently are burned up during the melting process in the electric melting furnace 1. Thus, the valve K6 can be controlled depending on the gas temperature, i.e. the valve K6 is opened upon an exceeding of a set point temperature of, for example, 600° C., measured ahead of the valve K6 or K7 with a thermo element 27, or of, for example, 80° C., measured by a temperature measuring apparatus 16 after the chambers 12 and 13. The valve K1 is incorporated into a control circuit, which comprises the temperature measuring apparatus 16, 27, the valve K6, as well as the valve K4, K5 ahead of the chambers 12, 13, as well as corresponding valves at the output port of the chambers. This control circuit serves only for the securing of the scrap heat station 15 against disturbances. The scrap heating station 15 can be separated from the total plant with this control circuit.

The further gas disposal is performed via the auxiliary blower 9 with valve K2 in open position. The power consumed by the blower station 4 can be substantially reduced based on the above-described set-up and, in fact, in a larger amount as energy is used for the operation of the blower 9.

A further improvement of the energy balance is achieved by incorporating a drying station 19 for the roll sinter. The drying station 19 is connected directly or indirectly via the bypass 7 to the exhaust device 5 as a further bypass via a line 18. Initially, a valve K7 is disposed in this region of the line 18 in flow direction of the gas. The drying station can be switched on or, respectively, switched off with the aid of the valve K7. A static mixer 22 follows, where possibly required infiltrated, false air for temperature control of the gas can be admixed in the static mixer 22 via a valve K8. The amount of infiltrated, false air is controlled via a feed temperature measuring apparatus 20. The drying station 19 is connected on its output side via line 18 to the exhaust device 5.

A further auxiliary blower 23 is disposed between the drying station 19 and the exhaust device 5, where the conveying capacity of the auxiliary blower is controlled via a following volume measuring apparatus 24, depending on a preset set point. The set point depends on the water content of the mud, on the throughput capacity, and the construction of the dryer.

In addition, a return temperature measuring apparatus 21 is disposed in the "discharging" part of the line 18. The return temperature measuring apparatus 21 closes the valve K7 in the case of exceeding or falling below of a preset limit temperature. This control circuit is superordinated to the control circuit of the mixer 22. A rotary drum is employed as a drying aggregate in the drying station 19. A partial stream of the hot oven exhaust gas is fed into the drying drum. The moist exhaust gas, containing in addition oil vapor from the mud drying, is added to the exhaust gas for scrap preheating behind the electric melt furnace 1, but ahead of the branch 6, whereby the oil vapor is burned off. The dried sinter can be processed to steel in the electric melt furnace 1, where the sinter is, for example, continuously charged to the electric melt furnace 1.

In case of an electric melt furnace with a tapping weight of about 70 tons, there are generated about 120–150 kwh/t liquid steel as exhaust gas heat, i.e. about 8,000 kwh for each charge. In case of scrap preheating of the charge, about 33% of the total amount of the exhaust gas heat is used for the drying, and for the drying of 5 tons of sinter mud with 12% moisture, about 5% of the exhaust gas heat is required. It can be recognized that, based on the lower heat requirements for the sinter mud drying, the plant can also be incorporated into existing plants for heat recovery, for example for hot water preparation.

It will be understood that each of the elements described above, or two or more together, may also find a useful application in other types of plants for the utilization of exhaust gases differing from the types described above.

While the invention has been illustrated and described as embodied in the context of a plant for the utilization of exhaust gases of an electric steel furnace, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A plant for the use of waste gases of an electric melting furnace for steel, comprising
    an electric melting furnace;
    a protective housing, where the electric melting furnace is surrounded by a protective housing;
    a blower station;
    an exhaust gas line, where the protective housing is connected with the exhaust gas line to the blower station;
    an adjustable first valve;
    a bag filter plant for cleaning of the furnace gas, where the blower station and the bag filter plant form an exhaust device for the furnace gas, which exhaust device is connected to the protective housing <electric melting furnace, >; a first bypass disposed to run in series to the exhaust device and having a return location and where the adjustable first valve is disposed between the connection location and the return location of the exhaust device; <a first bypass disposed to run in series to the exhaust device and having a return location;>
    a preheating <drying> station for starting materials to be charged to the electric melting furnace, disposed in the first bypass of the exhaust device;
    a branch disposed between the return location of the first bypass and the exhaust line;
    a second valve;
    a third valve;
    a first auxiliary blower, which can be switched on or, respectively, switched off, is disposed within the exhaust device in the branch between the return location of the first bypass and the exhaust line via second and third valves;
    a second bypass connected in series to the first bypass;
    a drying line wherein the drying station is connected to the second bypass or, respectively, to the exhaust device ahead of the connection location or after the return location via the drying line, thus forming the second bypass, which drying line can be switched on or off via a seventh valve;
    a second auxiliary blower placed into the drying line of the drying station for feeding back of the exhaust air into the exhaust device ahead of a withdrawal location.

2. The plant according to claim 1, further comprising a quantity measuring apparatus associated with the drying line and following the second auxiliary blower, where the throughput amount of the second auxiliary blower is controlled by the following quantity measuring apparatus depending on a preset set point value.

3. The plant according to claim 1, further comprising a pressure measuring apparatus connected to the first auxiliary blower, where the electric melting furnace comprises a furnace chamber, and where the pressure measuring apparatus measures the gas pressure in the furnace chamber, and where the gas pressure in the furnace chamber can be controlled according to the pressure condition in the furnace chamber.

4. The plant according to claim <2> 1, wherein
    the first bypass is branched into a first line and a second line;
    further comprising a preheating station disposed in the first bypass including a first chamber of a scrap preheating station connected to the first line and a second chamber of a scrap preheating station connected to the second line;

a fourth valve disposed in the first line where the first line can be switched on or, respectively, switched off with the fourth valve;

a fifth valve disposed in the second line where the second line can be switched on or, respectively, switched off with the fifth valve and where the exhaust gas leaving the scrap heating station is cooled to a temperature where condensation of the organic components contained in the exhaust gas is assured;

a temperature measuring apparatus disposed in the first bypass following the preheating station;

a control device for infiltrated, false air admixture provided in the first bypass for assuring cooling;

a sixth valve connecting the control device with the temperature measuring apparatus in the first bypass.

5. The plant according to claim 1, further comprising a main exhaust line connected to the electric melting furnace;

a dust measuring apparatus for measuring the dust content in the main exhaust line;

a third blower station disposed in the main exhaust line, wherein the third blower station is connected to the dust measuring apparatus for minimizing the blower capacities depending on a preset dust content.

6. The plant according to claim <2> 1, further comprising an eighth valve for the infiltrated, false air admixture disposed in the second bypass between the seventh valve and the drying station.

7. The plant according to claim 6, further comprising a static mixer connected to the eighth <slider> valve and disposed in the second bypass.

8. The plant according to claim 7, further comprising a feed temperature measuring device following the static mixer such that the eighth <slider> valve is controlled depending on temperature by the feed temperature measuring device;

a control circuit connected to the feed temperature measuring device;

a return-temperature measuring device superordinated to the control circuit associated with the feed temperature measuring device, which return temperature measuring device measures the temperature of the exhaust gas of the drying station and which return temperature measuring device controls the gas volume fed via the second bypass depending on temperature by adjusting of the seventh <slider> valve.

9. Plant for the use of waste gases of an electric melting furnace for steel, comprising an electric melting furnace having a protective housing, which protective housing is connected to an exhaust device for the furnace gas with a blower station and a bag filter plant for cleaning of the furnace gas;

a preheating <drying> station <(19)> (15) for starting materials to be charged to the electric melting furnace, disposed in a bypass of a second line leading from the furnace to the exhaust device, where said bypass is connected at a connection location (6) and at a return location (8) to the exhaust device, where the exhaust device is provided with at least one adjustable valve between the connection location (6) and the return location (8);

wherein the electric melting furnace (1) is surrounded by a protective housing (2), where the protective housing (2) is connected with an exhaust gas line (3) to the blower station (4), and where an auxiliary blower (9), which can be switched on or, respectively, switched off, is disposed within the exhaust device (5) in a branch (10) between the return location (8) of the bypass (7) and the exhaust line (3) via valves (K2, K3);

wherein a drying station (19) is connected to the bypass (7) or, respectively, to the exhaust device ahead of or after the connection location (6) via a line (18), forming a further bypass, which line (18) can be switched on or off via a valve (K7), and where a further auxiliary blower (23) is placed into the line (18) of the drying station (19) for feeding back of the exhaust air into the exhaust device (5) ahead of a withdrawal location.

10. Plant according to claim 9, wherein the throughput amount of the auxiliary blower (23) is controlled by a following quantity measuring apparatus (24) depending on a preset set point value.

11. Plant according to claim 9, wherein the auxiliary blower (9) is connected with a pressure measuring apparatus (11), which measures the gas pressure in the furnace space (1) and which can be controlled according to the pressure condition in the furnace chamber.

12. Plant according to claim <11> 9, wherein the bypass (7) is branched into at least two lines (7', 7"), which lines (7', 7") in each case are connected to a chamber (12, 13) of a scrap preheating station (15), and where the lines (7', 7") can be switched on or, respectively, switched off in each case with a valve (K4, K5), and where the exhaust gas leaving the scrap heating station is cooled to a temperature where condensation of the organic components contained in the exhaust gas is assured and where furthermore a control device for infiltrated, false air admixture is provided in a bypass (7) for this purpose, which control device is connected via a valve (K6) with a temperature measuring apparatus (16) in the bypass (7) following the preheating station (15).

13. Plant according to claim 9, wherein the blower station (4) is connected to a dust measuring apparatus (17), which dust measuring apparatus (17) measures the dust content in the exhaust line (3) and where the blower capacities can be minimized depending a preset dust content.

14. Plant according to claim <11> 9, wherein a further valve (K8) for the infiltrated, false air admixture is provided in the line (18) between the valve (K7) and the drying station (19); and wherein a static mixer (22) connected to the valve (K8) is disposed in the line (18).

15. Plant according to claim 14, wherein the <slider> valve (K8) can be controlled depending on temperature by a feed temperature measuring device (20), which follows the static mixer (22), and a return-temperature measuring device (21) is superordinated to the control circuit associated with the feed temperature measuring device (20), which measuring device measures the temperature of the exhaust gas of the drying station (19) and which measuring device controls the gas volume fed via the line (18), depending on temperature by adjusting of the <slider> valve (K7).

16. A method for setting up means for handling waste gases of an electric melting furnace for steel, comprising
surrounding an electric melting furnace with a protective housing;
connecting the protective housing with an exhaust gas line to a blower station;
cleaning of the furnace gas with a bag filter plant, where the blower station and the bag filter plant form an exhaust device for the furnace gas;
connecting the exhaust device to the electric melting furnace;
disposing the adjustable first valve between the connection location and the return location of the exhaust device; placing a first bypass in series to the exhaust device and having a return location;
placing a preheating <drying> station for starting materials to be charged to the electric melting furnace in the first bypass of the exhaust device;
placing a branch between the return location of the first bypass and the exhaust line;
placing a first auxiliary blower, which can be switched on or, respectively, switched off, within the exhaust device in the branch between the return location of the first bypass and the exhaust line via a second and a third valve;
connecting a second bypass in series to the first bypass; connecting a drying station to the second bypass or, respectively, to the exhaust device ahead of the connection location or after the return location via the drying line, thus forming a second bypass, which drying line can be switched on or off via a seventh valve;
placing a second auxiliary blower into the drying line of the drying station for feeding back of the exhaust air into the exhaust device ahead of a withdrawal location.

17. The method according to claim <19> 16, further comprising
connecting a quantity measurement apparatus to the drying line and following the second auxiliary blower, where the throughput amount of the auxiliary blower is controlled by the quantity measuring apparatus depending on a preset set point value;
connecting a pressure measuring apparatus to the first auxiliary blower, where the electric melting furnace comprises a furnace chamber and where the pressure measuring apparatus measures the gas pressure in the furnace chamber and where the gas pressure in the furnace chamber can be controlled according to the pressure condition in the furnace chamber;
branching the first bypass into a first line and a second line;
placing a preheating station in the first bypass including a first chamber of a scrap preheating station connected to the first line and a second chamber of a scrap preheating station connected to the second line;
placing a fourth valve in the first line, where the first line can be switched on or, respectively, switched off with the fourth valve;
placing a fifth valve in the second line where the second line can be switched on or, respectively, switched off with the fifth valve and where the exhaust gas, leaving the scrap heating station, is cooled to a temperature where condensation of the organic components contained in the exhaust gas is assured;
placing a temperature measuring apparatus in the first bypass following the preheating station;
placing a control device for infiltrated, false air admixture in the first bypass for assuring cooling;
connecting the control device to the temperature measuring apparatus in the first bypass with a sixth valve;
connecting a main exhaust line to the electric melting furnace;
placing a dust measuring apparatus for measuring the dust content into the main exhaust line;
placing a third blower station into the main exhaust line; connecting the third blower station to the dust measuring apparatus for minimizing the blower capacities depending on a preset dust content.

18. The method according to claim <19> 17, further comprising
placing an eighth valve for the infiltrated, false air admixture in the second bypass between the seventh valve and the drying station;
connecting a static mixer to the eighth valve in the second bypass;
placing a feed temperature measuring device to follow the static mixer such that the eighth valve is controlled depending on temperature by the feed temperature measuring device;
connecting a control circuit to the feed temperature measuring device;
superordinating a return-temperature measuring device to the control circuit associated with the feed temperature measuring device, which return temperature measuring device measures the temperature of the exhaust gas of the drying station and which return temperature measuring device controls the gas volume fed via the second bypass depending on temperature by adjusting of the seventh valve.

19. A method using waste gases of an electric melting furnace for steel, comprising
cleaning of the furnace gas from the electric melting furnace in a bag filter plant, where a blower station and the bag filter plant form an exhaust device for the furnace gas, which exhaust device is connected to the electric melting furnace and where an adjustable first valve is disposed between the connection location and the return location of the exhaust device, and wherein the electric melting furnace is surrounded by a protective housing, where the protective housing is connected with an exhaust gas line to the blower station, and where a first bypass is disposed to run in series to the exhaust device and having a return location;
preheating <drying> starting materials to be charged to the electric melting furnace in a preheating <drying> station disposed in the first bypass of <the exhaust device> a second line connection and wherein a branch is disposed between the return location of the first bypass and the exhaust line;
switching a first auxiliary blower on and off, where the first auxiliary blower is disposed within the exhaust device in the branch between the return location of the first bypass and the exhaust line via a second and a third valve; switching on and off a drying line forming a second bypass connected in series to the first bypass with a seventh valve, where a drying station is connected to the second bypass or, respectively, to the exhaust device ahead of the connection location or after the return location;

feeding back exhaust air into the exhaust device ahead of a withdrawal location with a second auxiliary blower placed into the drying line of the drying station.

20. The method according to claim <23> 19, further comprising controlling throughput amount of the first auxiliary blower by a following quantity measuring apparatus associated with the drying line and following the second auxiliary blower, depending on a preset set point value;

measuring the gas pressure in the furnace chamber with a pressure measuring apparatus connected to the first auxiliary blower, where the electric melting furnace comprises a furnace chamber; controlling the gas pressure in the furnace chamber according to the pressure condition in the furnace chamber and a set point, where the first bypass is branched into a first line and a second line, where a preheating station disposed in the first bypass includes a first chamber of a scrap preheating station connected to the first line and a second chamber of a scrap preheating station connected to the second line;

cooling exhaust gas leaving a scrap heating station to a temperature where condensation of the organic components contained in the exhaust gas is assured, where a fourth valve is disposed in the first line and where the first line can be switched on or, respectively, switched off with the fourth valve, and where a fifth valve is disposed in the second line and where the second line can be switched on or, respectively, switched off with the fifth valve, and where a temperature measuring apparatus is disposed in the first bypass following the preheating station, and where a control device for infiltrated, false air admixture is provided in the first bypass for assuring cooling, and where a sixth valve connects the control device with the temperature measuring apparatus in the first bypass, and where a main exhaust line is connected to the electric melting furnace;

measuring the dust content in the main exhaust line with a dust measuring apparatus and where a third blower station is disposed in the main exhaust line;

minimizing the blower capacities depending on a preset dust content with a third blower station connected to the dust measuring apparatus.

21. The method according to claim <23> 19, further comprising controlling an eighth valve for the infiltrated, false air admixture disposed in the second bypass between the seventh valve and the drying station depending on temperature measured at a feed temperature measuring device, where a static mixer is connected to the eighth valve and disposed in the second bypass and where the feed temperature measuring device follows the static mixer, and where a control circuit is connected to the feed temperature measuring device;

measuring the temperature of the exhaust gas of the drying station with a return-temperature measuring device superordinated to the control circuit associated with the feed temperature measuring device;

controlling the gas volume fed via the second bypass with return temperature measuring device depending on temperature by adjusting of the seventh valve.

22. A plant for the use of waste gases of an electric melting furnace for steel, comprising an electric melting furnace;

a protective housing, where the electric melting furnace is surrounded by a protective housing;

a blower station;

an exhaust gas line, where the protective housing is connected with the exhaust gas line to the blower station; an adjustable first valve;

a bag filter plant for cleaning of the furnace gas, where the blower station and the bag filter plant form an exhaust device for the furnace gas, which exhaust device is connected to the protective housing;

a first bypass disposed to run in series to the exhaust device and having a return location and where the adjustable first valve is disposed between the connection location and the return location of the exhaust device;

a drying station for starting materials to be charged to the electric melting furnace, disposed in the first bypass of the exhaust device;

a branch disposed between the return location of the first bypass and the exhaust line;

a second valve;

a third valve;

a first auxiliary blower, which can be switched on or, respectively, switched off, is disposed within the exhaust device in the branch between the return location of the first bypass and the exhaust line via second and third valves and wherein the first bypass is branched into a first line and a second line;

a preheating station disposed in the first bypass including a first chamber of a scrap preheating station connected to the first line and a second chamber of a scrap preheating station connected to the second line;

a fourth valve disposed in the first line where the first line can be switched on or, respectively, switched off with the fourth valve;

a fifth valve disposed in the second line where the second line can be switched on or, respectively, switched off with the fifth valve and where the exhaust gas leaving the scrap heating station is cooled to a temperature where condensation of the organic components contained in the exhaust gas is assured;

a temperature measuring apparatus disposed in the first bypass following the preheating station;

a control device for infiltrated, false air admixture provided in the first bypass for assuring cooling;

a sixth valve connecting the control device with the temperature measuring apparatus in the first bypass.

23. Plant for the use of waste gases of an electric melting furnace for steel, comprising an electric melting furnace having a protective housing, which protective housing is connected to an exhaust device for the furnace gas with a blower station and a bag filter plant for cleaning of the furnace gas;

a drying station (19) for starting materials to be charged to the electric melting furnace, disposed in a bypass of a second line connection leading from the furnace to the exhaust device;

wherein the electric melting furnace (1) is surrounded by a protective housing (2), where the protective housing (2) is connected with an exhaust gas line (3) to the blower station (4), and where an auxiliary blower (9), which can be switched on or, respectively, switched off, is disposed within the exhaust device (5) in a branch (10) between a return location (8) of a bypass (7) and the exhaust gas line (3) via valves (K2, K3);

wherein the bypass (7) is branched into at least two lines (7', 7''), which lines (7', 7'') in each case are connected to a chamber (12, 13) of a scrap preheating station (15), and where the lines (7', 7'') can be switched on or, respectively, switched off in each case with a valve (K4, K5), and where the exhaust gas leaving the scrap heating station is cooled to a temperature where condensation of the organic components contained in the exhaust gas is assured and where furthermore a control device for infiltrated, false air admixture is provided in the bypass (7) for this purpose, which control device is connected via a valve (K6) with a temperature measuring apparatus (16) in the bypass (7) following the preheating station (15).

24. A method for setting up means for handling waste gases of an electric melting furnace for steel, comprising surrounding an electric melting furnace with a protective housing;

connecting the protective housing with an exhaust gas line to a blower station;

cleaning of the furnace gas with a bag filter plant, where the blower station and the bag filter plant form an exhaust device for the furnace gas;

connecting the exhaust device to the electric melting furnace;

disposing the adjustable first valve between the connection location and the return location of the exhaust device; placing a first bypass in series to the exhaust device and having a return location;

placing a first drying station for starting materials to be charged to the electric melting furnace in the first bypass of the exhaust device;

placing a branch between the return location of the first bypass and the exhaust line;

placing a first auxiliary blower, which can be switched on or, respectively, switched off, within the exhaust device in the branch between the return location of the first bypass and the exhaust line via a second and a third valve;

connecting a second bypass in series to the first bypass;

connecting a preheating station to the second bypass or, respectively, to the exhaust device ahead of the connection location or after the return location via the drying line, thus forming a second bypass, which drying line can be switched on or off via a seventh valve;

placing a second auxiliary blower into the drying line of the drying station for feeding back of the exhaust air into the exhaust device ahead of a withdrawal location;

connecting a quantity measurement apparatus to the drying line and following the second auxiliary blower, where the throughput amount of the auxiliary blower is controlled by the quantity measuring apparatus depending on a preset set point value;

connecting a pressure measuring apparatus to the first auxiliary blower, where the electric melting furnace comprises a furnace chamber and where the pressure measuring apparatus measures the gas pressure in the furnace chamber and where the gas pressure in the furnace chamber can be controlled according to the pressure condition in the furnace chamber;

branching the first bypass into a first line and a second line;

placing the preheating station in the first bypass including a first chamber of a scrap preheating station connected to the first line and a second chamber of a scrap preheating station connected to the second line;

placing a fourth valve in the first line, where the first line can be switched on or, respectively, switched off with the fourth valve;

placing a fifth valve in the second line where the second line can be switched on or, respectively, switched off with the fifth valve and where the exhaust gas, leaving the scrap heating station, is cooled to a temperature where condensation of the organic components contained in the exhaust gas is assured;

placing a temperature measuring apparatus in the first bypass following the preheating station;

placing a control device for infiltrated, false air admixture in the first bypass for assuring cooling;

connecting the control device to the temperature measuring apparatus in the first bypass with a sixth valve;

connecting a main exhaust line to the electric melting furnace;

placing a dust measuring apparatus for measuring the dust content into the main exhaust line;

placing a third blower station into the main exhaust line; connecting the third blower station to the dust measuring apparatus for minimizing the blower capacities depending on a preset dust content.

25. A method using waste gases of an electric melting furnace for steel, comprising cleaning of the furnace gas from the electric melting furnace in a bag filter plant, where a blower station and the bag filter plant form an exhaust device for the furnace gas, which exhaust device is connected to the electric melting furnace and where an adjustable first valve is disposed between the connection location and the return location of the exhaust device, and wherein the electric melting furnace is surrounded by a protective housing, where the protective housing is connected with an exhaust gas line to the blower station, and where a first bypass is disposed to run in series to the exhaust device and having a return location;

preheating starting materials to be charged to the electric melting furnace in a preheating station disposed in the first bypass of the exhaust device and wherein a branch is disposed between the return location of the first bypass and the exhaust line;

switching a first auxiliary blower on and off, where the first auxiliary blower is disposed within the exhaust device in the branch between the return location of the first bypass and the exhaust line via a second and a third valve; switching on and off a drying line forming a second bypass connected in series to the first bypass with a seventh valve, where a drying station is connected to the second bypass or, respectively, to the exhaust device ahead of the connection location or after the return location;

feeding back exhaust air into the exhaust device ahead of a withdrawal location with a second auxiliary blower placed into the drying line of the drying station;

controlling throughput amount of the first auxiliary blower by a following quantity measuring apparatus associated with the drying line and following the second auxiliary blower, depending on a preset set point value;

measuring the gas pressure in the furnace chamber with a pressure measuring apparatus connected to the first auxiliary blower, where the electric melting furnace comprises a furnace chamber; controlling the gas pressure in the furnace chamber according to the pressure condition in the furnace chamber and a set point, where the first bypass is branched into a first line and a second line, where a preheating station disposed in the first bypass includes a first chamber of a scrap preheating station connected to the first line and a second chamber of a scrap preheating station connected to the second line;

cooling exhaust gas leaving a scrap heating station to a temperature where condensation of the organic components contained in the exhaust gas is assured, where a fourth valve is disposed in the first line and where the first line can be switched on or, respectively, switched off with the fourth valve, and where a fifth valve is disposed in the second line and where the second line can be switched on or, respectively, switched off with the fifth valve, and where a temperature measuring apparatus is disposed in the first bypass following the preheating station, and where a control device for infiltrated, false air admixture is provided in the first bypass for assuring cooling, and where a sixth valve connects the control device with the temperature measuring apparatus in the first bypass, and where a main exhaust line is connected to the electric melting furnace;

measuring the dust content in the main exhaust line with a dust measuring apparatus and where a third blower station is disposed in the main exhaust line;

minimizing the blower capacities depending on a preset dust content with a third blower station connected to the dust measuring apparatus.

* * * * *